United States Patent [19]

Bennett

[11] Patent Number: 4,918,579

[45] Date of Patent: Apr. 17, 1990

[54] APPARATUS FOR ILUMINATING AN ENVIRONMENT WHICH OPERATES BELOW NORMAL AMBIENT TEMPERATURE

[75] Inventor: Derek N. Bennett, Edmonton, England

[73] Assignee: Less Lighting Limited, Edmonton, England

[21] Appl. No.: 342,138

[22] Filed: Apr. 24, 1989

[30] Foreign Application Priority Data

Mar. 13, 1989 [GB] United Kingdom ................ 8905684

[51] Int. Cl.⁴ ...................... F21V 8/00; F25D 27/00; F25D 21/02
[52] U.S. Cl. ..................................... 362/32; 362/126; 362/133; 312/223; 108/23
[58] Field of Search ................ 362/32, 125, 126, 133; 312/114, 223; 108/23

[56] References Cited

U.S. PATENT DOCUMENTS

| 2,148,159 | 2/1939 | Hill | 362/126 |
|---|---|---|---|
| 2,259,147 | 10/1941 | Ahrens | 362/126 |
| 2,438,972 | 4/1948 | Hoffman | 362/126 |
| 3,131,690 | 5/1964 | Innis et al. | 362/32 |
| 3,781,537 | 12/1973 | Ramsey | 362/32 |

FOREIGN PATENT DOCUMENTS 2073930 10/1981 United Kingdom ................ 362/32

Primary Examiner—Ira S. Lazarus
Assistant Examiner—Peggy Neils
Attorney, Agent, or Firm—Diller, Ramik & Wight

[57] ABSTRACT

Apparatus for illuminating an environment which operates below normal ambient temperature, comprising one or more strands of fibre optic light transmitters which extend from within the environment to a point outside it, a light emitting first part of each fibre optic being location within said environment, and means for delivering light into a second part of said fibre optic strand or strands outside said environment.

12 Claims, 4 Drawing Sheets

APPARATUS FOR ILUMINATING AN ENVIRONMENT WHICH OPERATES BELOW NORMAL AMBIENT TEMPERATURE

BACKGROUND OF THE INVENTION

This invention relates to apparatus for illuminating areas opeating below normal ambient temperatures. Such environments exist, for example, within food display cabinets which are commonly used in self-service shops and other establishments. It is common practice to illuminate such cabinets by, for example, fluorescent lighting or other lighting means but this lighting causes problems due to the emission of heat. Thus although the environment within the cabinet is intended to be below the normal ambient temperature in order to preserve the foodstuffs within the cabinet the lighting tends to raise the temperature thus causing the expenditure of more energy in the cooling apparatus to maintain the low temperature required.

The present invention is intended to provide apparatus for overcoming the difficulties referred to above.

SUMMARY OF THE INVENTION

According to the present invention apparatus for illuminating an environment which operates below normal ambient temperature comprises one or more strands of fibre optic light transmitters which extend from within the environment to a point outside it, a light emitting first part of each fibre optic being located within said environment and means for delivering light into a second part of said fibre optic strand or strands outside said environment. Thus, with the apparatus according to the invention, the light source is outside the environment and the heat which emanates from it can thus be dissipated without affecting the environment itself, any heat emitted by the fibre optic strands being minimal.

Preferably a cluster of fibre optic strands are employed.

In a convenient embodiment a single light source delivers light to the second part of a number of said fibre optic strands or a number of said clusters, the light emitting parts of which are located at different positions within said environment.

The environment may thus be provided within a cabinet, for example a food display cabinet.

Such a cabinet can be provided with a door, the light emitting parts of the strands or clusters being located within the surrounding frame thereof, again, the strands or clusters can be arranged level with any shelves which are provided or can be located in a roof to the cabinet.

In a convenient construction the surrounding frame for the door can be provided with a transparent panel or a light emitting panel connected to one or more of the fibres or clusters.

Preferably the said fibre optic strands or clusters may include a junction at the entrance to the environment which will assist in assembly.

The invention also includes a cabinet embodying apparatus as set forth above.

The invention can be performed in many ways and some embodiments will now be described by way of example and with reference to the accompanying drawings in which:

DESCRIPTION OF THE PREFERRED EMBODIMENTS

Figure 1:
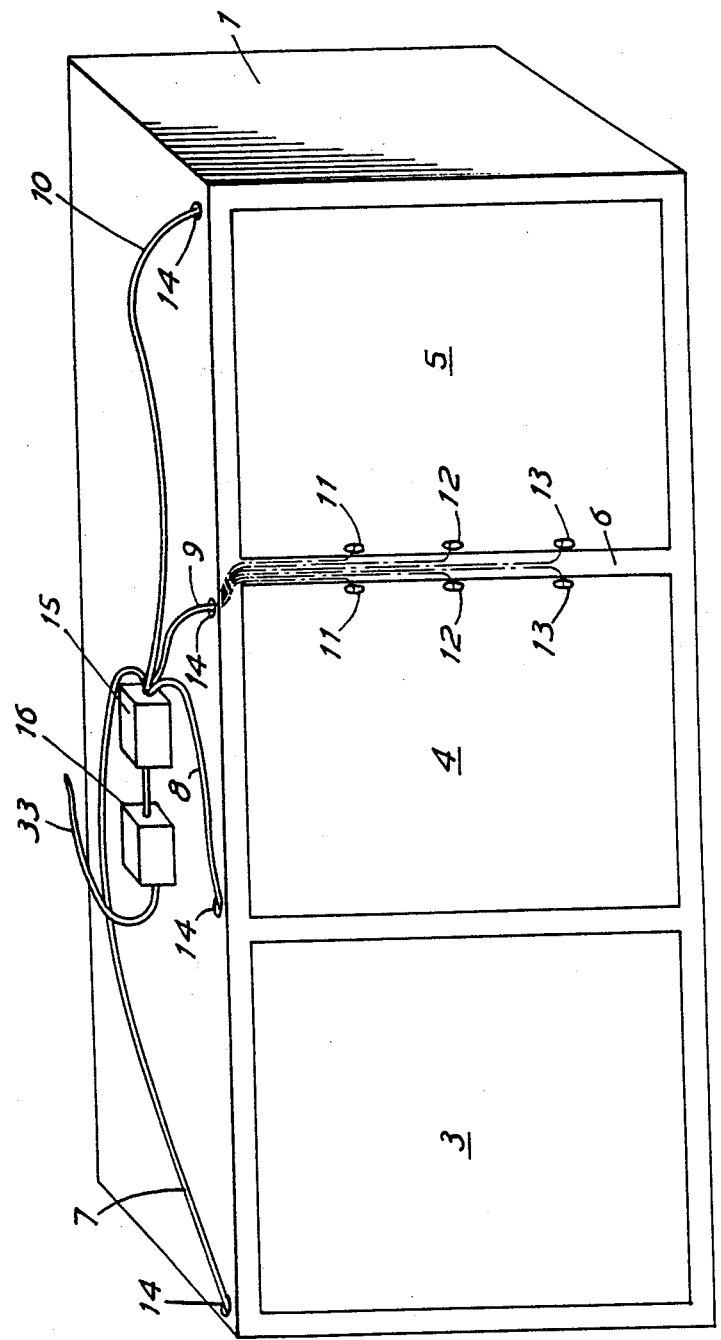
FIG. 1 is a diagrammatic representation of apparatus according to the invention employed with a foodstuffs display cabinet.
Figure 2:
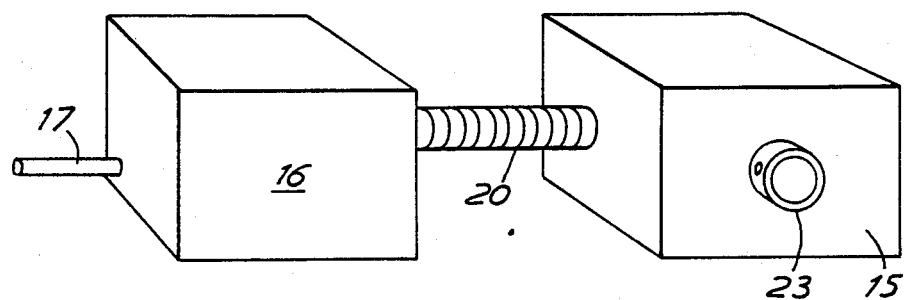
FIG. 2 is an isometric view of a control gear housing and an optic box for a lamp and which receives the fibre optics.

As shown in FIG. 1 the invention is applied to a food cabinet or case in which frozen food is displayed for sale. The cabinet 1 has the usual shelves (not shown) and glass doors 3, 4 and 5. The doors are carried within surrounding door frames one of which is indicated by reference numeral 6. The temperature in the frozen food case is kept below normal ambient temperatures to ensure that the frozen food offered for sale does not defrost. In order to provide illumination for the environment within the cabinet 1 a number of clusters of strands of fibre optic light transmitters are provided indicated by reference numerals 7, 8, 9 and 10. These fibre optic light transmitters extend to the upper end of each of the door frame supports and each consists of, for example, six light transmitters, each transmitter being formed by a cluster of fibre optic strands. The light transmitters indicated by reference numeral 9 are thus arranged to extend to three separate levels of the abutment as indicated by reference numerals 11, 12 and 13 thus providing illumination at the levels concerned. It will be appreciated that similar illumination is provided by the fibre optics indicated by reference numerals 7, 8 and 10.

Figure 3:
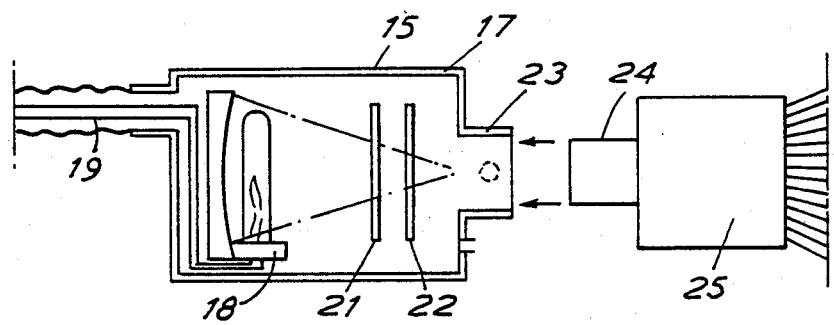
FIG. 3 is a diagram showing details of the optics box shown in FIG. 2 and a common end fitting for the fibre optics.

The fibre optic strands thus extend from within the environment within the cabinet to a point outside it and suitable sealing 14 is provided at each entrance point to preserve the environment within the cabinet. The light emitting parts of the fibres 11, 12 and 13 are within the cabinet and means to deliver lights into the fibre optic system is provided by an optic box 15 having control gear 16 which receives power through an electrical mains connection 33. It will be seen that the optic box with its light source is outside the cabinet and thus there is no transfer of heat from the light source itself into the environment within the cabinet. clearly in FIG. 3. The box comprises an outer casing 17 in which is housed a mirror lamp assembly 18 to which appropriate electrical connections 19 are made. The connections 19 enter the control box 16 through a flexible conduit 20. The optical system has a focal point FP and passes through filters 21 and 22 to remove ultra-violet and some infra-red light so that very light heat is transmitted to the low temperature environment.

The end of the casing 17 carries a plug fitting 23 to receive a co-operating fitting 24 provided on a common end fitting 25 for the optical fibres.

Figure 4:
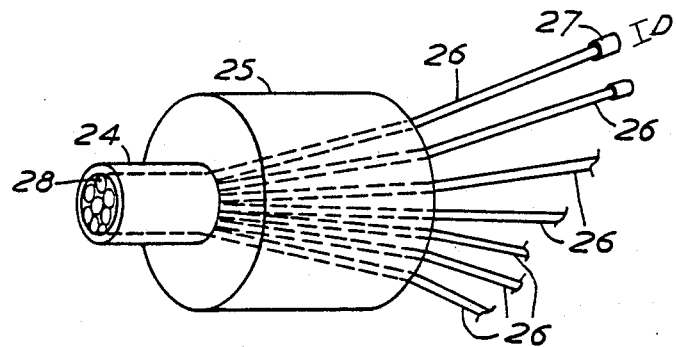
FIG. 4 is an isometric view of the common end fitting shown in FIG. 3.

In the arrangement shown in FIG. 4, and which is merely an example, seven clusters of fibre optic fibres are shown and indicated by reference numeral 26. Each cluster of fibres is intended to illuminate a sub-array and thus in the arrangement shown in FIG. 4 seven sub-arrays can be used. Each cluster of fibres is sleeved with a silicone rubber sleeve 27 to prevent mechanical damage. Due to their small size the clusters of fibres are not indicated in the drawings but it will be appreciated that each cluster consists of a multiplicity of individual fibre strands. The open end 28 of each cluster of fibres is aligned with the other fibres from the other sub-arrays and is held in the fitting 24 so that when the end fitting 25 is in place in the socket 23 the ends 28 of the clusters of fibres coincide with the Focal Point FP. The light is thus transmitted through the fibres. Each cluster of fibres may be of any diameter between 1.00 mm to 25 mm depending upon the number of fibre strands. The part of each cluster extending away from the end fitting will be identified as a tail 34.

Between 1 and up to 55 tails can be provided depending upon requirements are they are fitting into the low temperature cabinet in such a way as to evenly illuminate the interior to enable clear observation from outside the case, typically through glass doors.

The tails 34 can be fitted around any area within the cabinet, for example on the door frames, in the door frames, in the cold air passages on or in the shelving or at any other convenient location. In the arrangement shown in FIG. 5 the ends of the tails 34 extend through openings 29 in the roof or upper end wall 30 of the cabinet 1. The openings 29 being sealed with appropriate grommets at 31. The ends of the tails 34 within the cabinet thus emit light from above.

Figure 6:
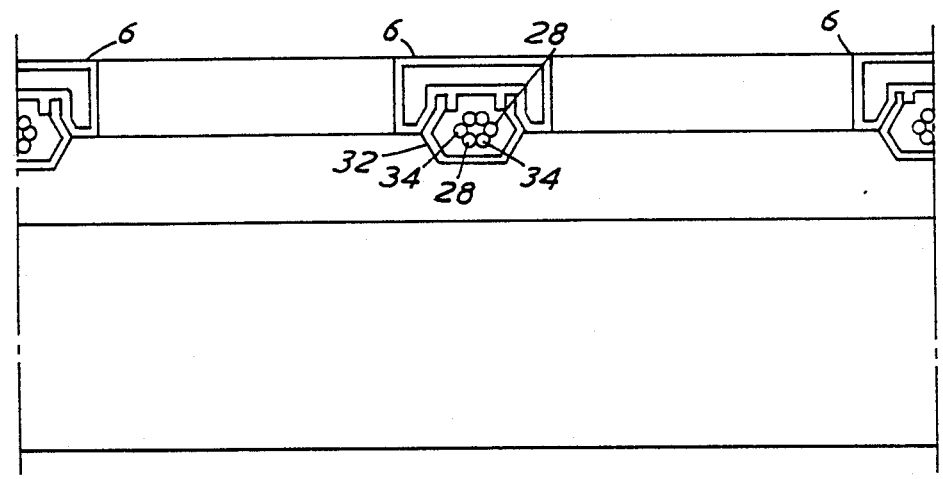
FIG. 6 is a diagrammatic plan view of a cabinet provided with doors and showing how the fibre optics are carried in the surrounding door frames.
Figure 7:
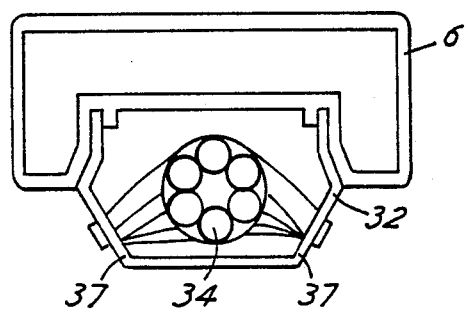
FIG. 7 is an enlarged plan view of one of the door frames.
Figure 8:
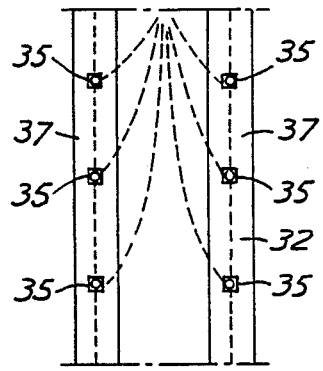
FIG. 8 is a side view of the door frames.
Figure 9:
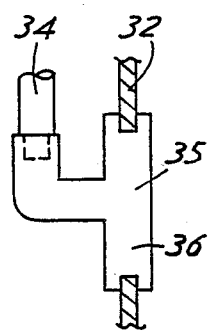
FIG. 9 is a part cross-sectional view showing an end fitting for the fibre optics located in a door frame.
Figure 10:
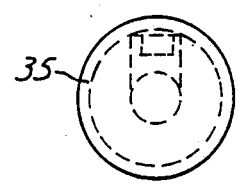
FIG. 10 is an end elevation of the end fitting shown in FIG. 9.
Figure 11:
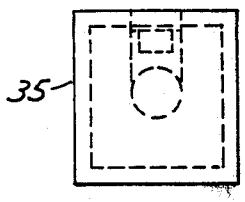
FIG. 11 is an end view of an alternative construction of the end fitting shown in FIG. 9.

FIG. 6 shows an arrangement in which six tails 34 extend vertically down each of the door support frames indicated by reference numeral 6. This arrangement is similar to that shown in FIG. 1. The door frames 6 are made from aluminium extrusions and an aluminium snap on cover 32 is provided. Each of the tails 34 is connected to a light emission panel 35 which is most clearly shown in FIGS. 9, 10 and 11. This panel 35 is made from light emitting material so the light carried through the tail 34 is emitted. The panels may be circular as shown in FIG. 10 or rectangular as shown in FIG. 11 and they are located in appropriate openings 36 in the cover 32 in the plans shown in FIGS. 7 and 8. Thus the panels are arranged on angled walls 37 of the snap on cover 32 at three different vertical levels.

In order to assist assembly the tails 34 are provided with a connector (not shown) at the upper end of each of the covers 32 thus enabling the tails to be assembled into each cover and then connected when the cover has been assembled in place on the frame 6.

Figure 12:
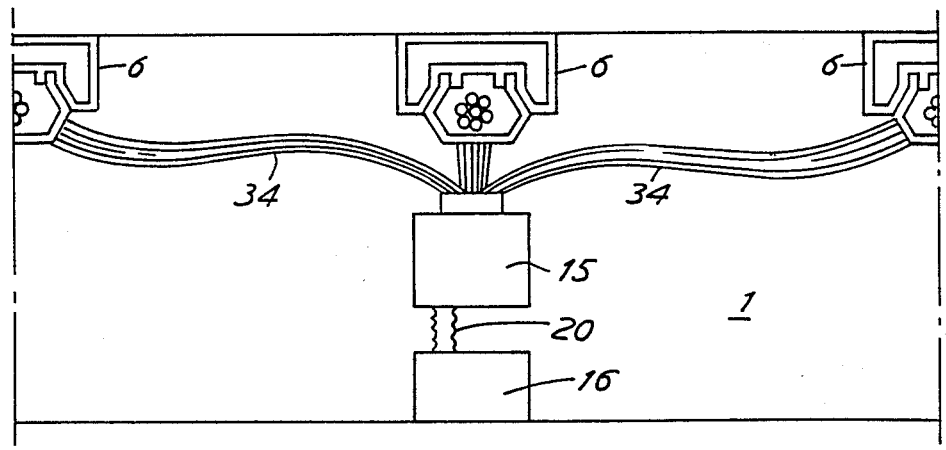
FIG. 12 is a plan view showing how the apparatus is installed.

FIG. 12 is a plan view of the top of the cabinet 1 showing a typical array with means for connecting the tails to three of the door frame supports 6.

In a typical example for use with a cabinet which is twelve feet long and which has six doors and seven door pillars, thirty six light emitting tails would be required, thus each end pillar would carry three light emitting arrays and the remaining five pillars would each carry 6.

Figure 5:
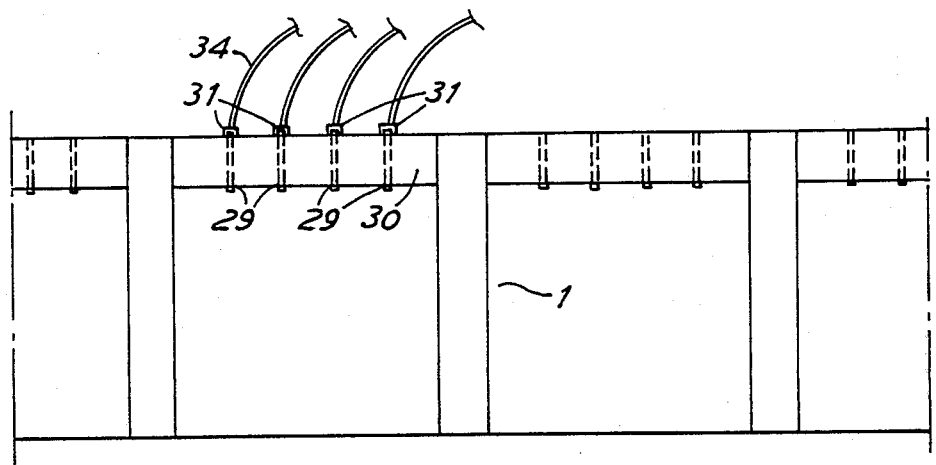
FIG. 5 is a diagrammatic illustration of part of a cabinet showing how the fibre optics can be placed in its upper end wall.

With an overhead array, for example as shown in FIG. 5, four light emitting heads could be provided above each door, and if, for example, there were six doors then twenty four light emitting heads would be required.

The transmission of the light is axial in the arrangements described above so that there is very little attenuation, typically 150 dB to 700 dB.

It has also been possible to use a linear fibre optic array coupled to the axial array for different applications.

Fibre optic arrays, in the form of the tails 34, are pliable down to −40° C. with no increase in attenuation.

A typical specification for, for example, a twelve foot cabinet with a door support frame array and having nine mullions could comprise two hundred and fifty watt projectors and two optical systems. The array for each projector could comprise a common head 25 each carrying eighteen tails 34, 25 mm diameter, 1 mm long with heads of 5.0 mm diameter. Each tail could comprise a further linear fibre which is intended for fitting in the door frame and these fibres would be of three appropriately different lengths.

The array would be duplicated for the other projector.

The advantages of the apparatus are that light can be introduced without heat thus preventing the encouragement of bacterial growth in the cabinet. The apparatus lowers energy costs as the system can be designed to replace conventional fluorescent lighting within the environment concerned. The maintenance for such fluorescent lighting is drastically reduced, the arrangement provides a longer lamp life, virtually indestructible system and thus better marketing possibilities for the user. It will be appreciated that the invention is not necessarily limited to use in food cabinets but can also be used in any form of environment which is to be below ambient temperature, for example laboratory cases or in certain industrial applications.

The specification of the optical fibre which has been found suitable for use with the invention is as follows:

| Base Material | Glass |
|---|---|
| Refractive Index Profile | Step |
| Refractive Index Core | 1.62(nd) |
| Refractive Index Cladding | 1.515(nd) |
| Numeral Aperture | 0.57(NA) |
| Acceptance Angle | 34.50 deg. |
| Attenuation at 850 nm | 150 dB/km |
| Transmission at 850 nm at 1 m | 96.5% Nom |
| Effective Active Area | 88.4% Nom |
| Temperature Range of Glass | −60 degrees Celsius to +400 degrees Celsius |
| Temperature Range of Complete Harness | −60 degrees Celsius to +135 degrees Celsius |
| Size of Single Fibre | 50 Micron Diameter |
| Visible Wave Length | 400 to 780 nm |

I claim:

1. Apparatus for illuminating an environment which operates below normal ambient temperature comprising an enclosure having an interior adapted to house product at below normal ambient temperatures, means for creating below normal ambient temperature within said enclosure interior, means for indiscriminately illuminating said enclosure interior with noninformative light, said indiscriminate illuminating means including at least one fibre optic light transmitter strand, said fibre optic light transmitter strand extending from within said enclosure interior to a point outside said enclosure interior, a light emitting first part of said fibre optic light transmitter strand being located within said enclosure interior, and means for delivering light into a second part of said fibre optic light transmitter strand located outside of said enclosure interior.

2. Apparatus as claimed in claim 1 in which a cluster of fibre optic light transmitter strands are employed.

3. Apparatus as claimed in claim 1 in which a single light source delivers light to the second part of a number of said fibre optic light transmitter strands, and light emitting first parts of said fibre optic light transmitter strands are located at different parts within said enclosure.

4. Apparatus as claimed in claim 1 in which said enclosure is a cabinet.

5. Apparatus as claimed in claim 4 in which said cabinet is provided with a door, and said light emitting first parts of the fibre optic transmitter strands are located within a surrounding frame of said door.

6. Apparatus as claimed in claim 4 in which said cabinet is provided with shelves, and said fibre optic light transmitter strands are arranged level therewith.

7. Apparatus as claimed in claim 4 in which said fibre optic light transmitter strands are located in a roof to said cabinet.

8. Apparatus as claimed in claim 5 in which said surrounding frame is provided with one of a transparent panel and a light emitting panel connected to one or more of the fibre optic light transmitter strands.

9. Apparatus as claimed in claim 1 in which said fibre optic light transmitter strands include a junction at an entrance to the enclosure.

10. Apparatus as claimed in claim 1 in which a plurality of said fibre optic transmitter strands are utilized in a linear fibre optic array.

11. Apparatus as claimed in claim 10 in which said linear fibre optic array is coupled to an axial array.

12. Apparatus as claimed in claim 1 in which the means for delivering light is provided by an optics box within which a light source is provided and into which extends the second part of said fibre optic light transmitter strand.

* * * * *